INVENTOR
Nicholas Viszlocky

United States Patent Office 3,053,927
Patented Sept. 11, 1962

3,053,927
ATOMIC BATTERY AND TEST INSTRUMENT
Nicholas Viszloczky, New York, N.Y.
(79—08 147th St., Kew Gardens, N.Y.)
Filed Feb. 23, 1960, Ser. No. 10,368
1 Claim. (Cl. 136—89)

This invention relates to batteries; more particularly this invention relates to nuclear energy powered batteries.

The present invention further relates to a test or like instrument utilizing such a battery.

This application is a continuation-in-part of my copending application Serial No. 590,768, filed June 11, 1956, now abandoned, for "Atomic Battery."

A major problem with chemically actuated batteries lies in the comparatively short battery life. The amount of electrical energy produced by chemical reaction inside the battery cell depends strictly on the mass of reactive materials incorporated in the battery. Since the total weight of the battery is frequently limited for one reason or another, small batteries deliver a distressingly low amount of ampere hours.

The energy produced by nuclear energy is many times greater than the energy produced by chemical reactions. For battery purposes, substantially direct conversion of the nuclear energy to electricity is essential. Even with the restrictions imposed by safety requirements, a small nuclear energy powered battery would be extremely desirable for many purposes, and in particular wherever a constant drain of current is needed.

The prime object of this invention is to provide a nuclear powered battery.

A further object of this invention is to provide a portable nuclear powered battery.

Objects pertaining to the test or like instrument aspects of this invention are to provide a battery capable of giving an adjustable and/or variable output: an instrument capable of giving an output variable in response to linear or angular movement; an instrument for comparing two linear or angular movements; a simple or comparison-type densitometer; a simple or comparison-type polarimeter; a simple or comparison-type liquid level indicator; an ultrasonic detector.

Briefly stated this invention comprises the combination of a radioactive light source and at least one photocell. The photocell is, of course, provided with leads so that current utilizing devices can be attached thereto. Suitable shielding is provided around the battery.

Radium-activated light sources (self luminous) have been available for a long time. Such light sources are characterized by low light level (50 micro-lamberts), rapid and unpredictable light decay, undesirable radiation hazards associated with their use, and their associated decay products.

These light sources are by their very nature unsuitable for the conversion of light into electricity (photo-electricity) for commercial use.

Strontium 90 activated fluorescent light sources are peculiarly advantageous for purposes of this battery. They have a high level of light output and a low level of radiation output, compared for example to radium activated light sources. Also, strontium 90 activated fluorescent self luminous light sources can be fabricated in a wide range of brightness throughout the visible spectrum which is desirable since different photocells have a peak response in different parts of the visible spectrum.

Such light sources fabricated from strontium 90 activated fluorescent materials show excellent luminous decay characteristics having a relatively low and predictable decay in luminous intensity and having a relatively long life as compared to other self luminous sources. Furthermore, with proper shielding, the inherent radiation hazard is substantially nil.

The photocell, upon which the light from the strontium 90 light source impinges, serves to convert the light energy into electrical energy. Highly efficient photocells, e.g. selenium, silicon, are commercially available, and their construction forms no part of the instant invention. However, it should be noted that there is a correlation between the characteristics of the light source and those of the photocell. Insofar as the photocell is capable of converting light into electrical energy, this characteristic determines the type of phosphor in the light source.

The invention will be better understood when taken in connection with the accompanying drawing in which.

Figure 1:
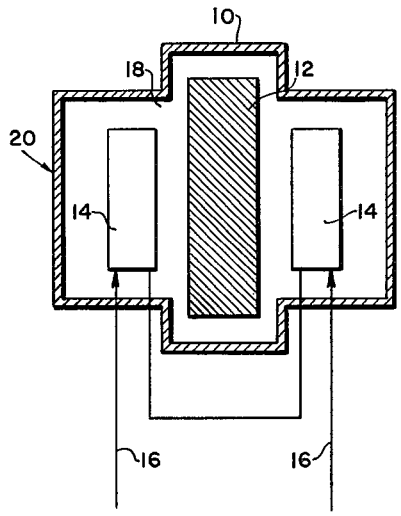
FIG. 1 illustrates a preferred mode of battery construction.

The battery 10 as a whole is comprised by a self luminous strontium 90 activated light source 12. Light source 12 contains strontium 90 and one or more suitable phosphors such as ZnS, CdSAg, ZnSAg, etc. intimately admixed and bound in a glass matrix. Other materials transparent to radiation are contemplated as well, e.g. plastics, fused quartz, etc. Adjacent each side of light source 12 is a photocell 14 adapted to convert the light energy emitted by source 12 into electrical energy. Leads 16 connected to photocells 14 draw off the electrical energy to a point of utilization. As shown in the drawing the photocells may be connected in series to increase voltage, or if desired in parallel to provide increased current. Although the output of a single such battery is low, it may be sufficient for circuits needing but small amounts of current, e.g. transistors. Also, if necessary, several batteries may be connected to provide the needed amount of electrical energy.

Preferably, photocells 14 are spaced from light source 12 by an airgap 18 or a light transparent separating layer. The separation need only be of such width to serve to prevent chemical interaction between the photocell material and the materials in light source 12. A gap of less than 10 microns is sufficient.

The whole battery unit 10 is encased by a shielding substance 20, e.g. lead, to ensure that no radiation primary or secondary emitted by the strontium 90 escapes beyond the battery confines and endangers the user.

Figure 2:
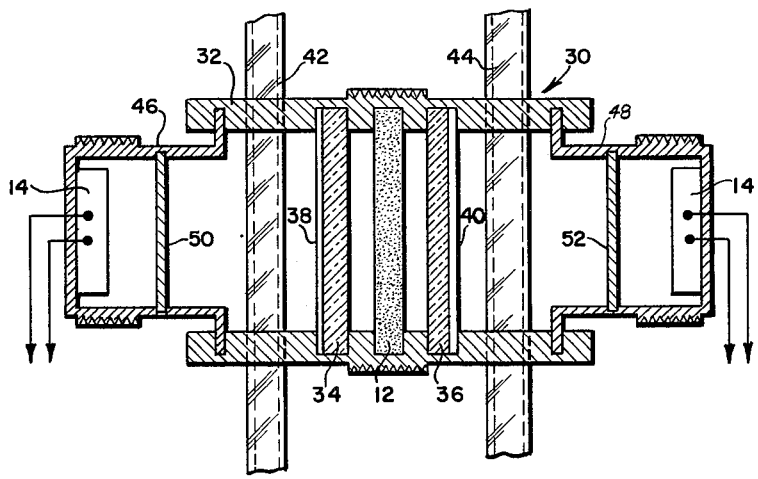
FIG. 2 illustrates an instrument or like type device based thereon.

The device 30 shown in FIG. 2, external shielding 32, which may be in the form of a tubular housing, is provided. Centrally in the shielding 32 is a phosphor 12 having on either side thereof transparent separating means 34 and 36 which may be glass. Adjacent the means 34 and 36 are polarizers 38 and 40, positioned as shown. Transparent test chambers 42 and 44, which may be open at their both ends or at only one end, are provided behind the polarizers.

Two revolvable shielding elements 46 and 48 are journaled with shielding 32, at opposite ends thereof, and house the analyzers 50 and 52 and the photocells 14. Analyzers 50 and 52 are actually polarizer plates, like polarizers 38, 40.

Light emitted from phosphor 12 and polarized can be received by and activate the photocells. Rotation of elements 46 and 48 can vary the total light received by photocells 14, as can the density of material in the test chambers 42 and 44.

With elimination of light variation effects, the device 30 can be used to provide for—

(1) Independently adjustable photocell outputs for varied circuit needs—bias voltages, stable voltage-reference sources, etc.

(2) Independent photocell outputs proportional to angular rotation of elements 46 and 48 with reference to the shielding 32. Any action, function, or device which provides an angular displacement or rotation, is capable of detection, measurement, comparison and control.

(3) Independent photocell outputs proportional to linear displacement. Any action, function, or device producing linear movement or displacement can cause a light-modifying means to pass through the test chambers, thereby producing variations in photocell output which can be used to detect, measure, compare or control the linear movement or displacement.

The device 32 as an atomic electro-optical device, can be used, either in its entirety, for comparison, or one-half thereof. Some uses are:

(1) A simple or comparison-type densitometer which can measure or indicate the thickness of a plating or coating and the impurity concentration in liquids and gases. In the simple type either test chamber may be used to contain the specimen being tested. In the comparison-type one chamber contains the standard while the other contains the specimen undergoing test or comparison.

(2) A simple or comparison-type of polarimeter which can indicate the amount of specific rotation produced in the plane of polarization of light in optically active substances. Commercially and medicinally, the amount of rotation produced affords a method of estimating the concentration of a given substance present in a solution. As in the densitometer application, either chamber may be employed independently of the other or in combination for comparison.

(3) A simple or comparison-type of liquid level indicator which can indicate or control the level of a variety of liquids. As such the test chambers are made part of the liquid container and located at the desired height of liquid level.

(4) As an ultrasonic detector whereby any changes in the index of refraction of a liquid or transparent solid contained in the test chambers varies photocell outputs, said device can function for the detection and control of such ultrasonic waves.

Although preferred embodiments of the invention have been described it will be obvious to those skilled in the art that various changes and modifications may be made without departing from the true spirit and scope of this invention.

What is claimed is:

A battery for production of electrical energy comprising in combination a light source and photocells, said light source consisting essentially of beta particle emitting strontium 90 intimately admixed with a beta-excitable phosphor and bound in a radiation transparent matrix, said photocells being mounted adjacent the sides of said light source, said light source and said photocells being separated by a light transparent layer of about 10 microns for preventing chemical interaction between materials in said photocell and materials of said light source, and said battery being totally shielded by lead to insure that no radiation emitted by the strontium 90 escapes to endanger the user.

References Cited in the file of this patent

UNITED STATES PATENTS

| | | |
|---|---|---|
| 2,140,368 | Lyle | Dec. 13, 1938 |
| 2,194,910 | Pineo | Mar. 26, 1940 |
| 2,259,372 | Geisler | Oct. 14, 1941 |
| 2,749,251 | Shapiro | June 5, 1956 |
| 2,754,428 | Franks | July 10, 1956 |
| 2,938,938 | Dickson | May 31, 1960 |

FOREIGN PATENTS

| | | |
|---|---|---|
| 638,106 | Great Britain | May 31, 1950 |

OTHER REFERENCES

Thomas, A.: "Address on Nuclear Batteries," Apr. 25–30 and June 20–25, 1955, pp. 1–5.